United States Patent
Nakamura et al.

(10) Patent No.: US 7,110,451 B2
(45) Date of Patent: Sep. 19, 2006

(54) BITSTREAM TRANSCODER

(75) Inventors: Taku Nakamura, Yokohama (JP);
Naoki Yamamoto, Yokohama (JP);
Takuya Imaide, Fujisawa (JP);
Hiroyasu Ohtsubo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 693 days.

(21) Appl. No.: 10/279,533

(22) Filed: Oct. 23, 2002

(65) Prior Publication Data

US 2003/0227974 A1    Dec. 11, 2003

(30) Foreign Application Priority Data

Jun. 11, 2002    (JP)    ............................. 2002-170476

(51) Int. Cl.
*H04N 7/12*    (2006.01)
(52) U.S. Cl. ............................. 375/240.03; 375/240.16
(58) Field of Classification Search ........... 375/240.16, 375/240.12, 240.13, 240.18, 240.21, 240.26, 375/240.03; 382/251
See application file for complete search history.

(56) References Cited

U.S. PATENT DOCUMENTS

| | | | |
|---|---|---|---|
| 6,141,456 A | 10/2000 | Pearlstein et al. | |
| 6,526,099 B1 * | 2/2003 | Christopoulos et al. | ............ 375/240.26 |
| 6,647,061 B1 * | 11/2003 | Panusopone et al. | .. 375/240.12 |
| 6,671,320 B1 * | 12/2003 | Beacken et al. | ........ 375/240.16 |
| 6,671,322 B1 * | 12/2003 | Vetro et al. | ............ 375/240.16 |
| 6,950,468 B1 * | 9/2005 | Satoh et al. | ........... 375/240.13 |

FOREIGN PATENT DOCUMENTS

| | | |
|---|---|---|
| JP | 2001-204026 | 7/2001 |
| JP | 2001-204027 | 7/2001 |
| JP | 2001-285863 | 10/2001 |
| JP | 2001-285875 | 10/2001 |
| WO | WO 99/34328 | 7/1999 |

* cited by examiner

*Primary Examiner*—Gims Philippe
(74) *Attorney, Agent, or Firm*—Townsend and Townsend and Crew LLP

(57) ABSTRACT

In a bitstream transcoder, the computational cost and the memory area are suppressed so that stream transcoding is performed with a reduced number of times of computing and a reduced memory area. The transcoder includes a VLD portion 11 for performing VLD on a bitstream encoded in MPEG-2 to output quantized DCT coefficients; an IQ portion 12 for receiving the coefficients, and outputting inverse-quantized DCT coefficients; a coefficient table 132 for storing a transformation matrix obtained by multiplying transformation matrices for operating band-limiting filter, IDCT, down-sampling and DCT, respectively, together in advance; a DCT scaling portion 13 for performing down-sampling on the DCT coefficients by use of the transformation matrix; a Q portion 15 for outputting quantized DCT coefficients down-sampled horizontally and vertically; and a VLC portion 16 for encoding the quantized DCT coefficients in MPEG-4 to output a bitstream.

3 Claims, 7 Drawing Sheets

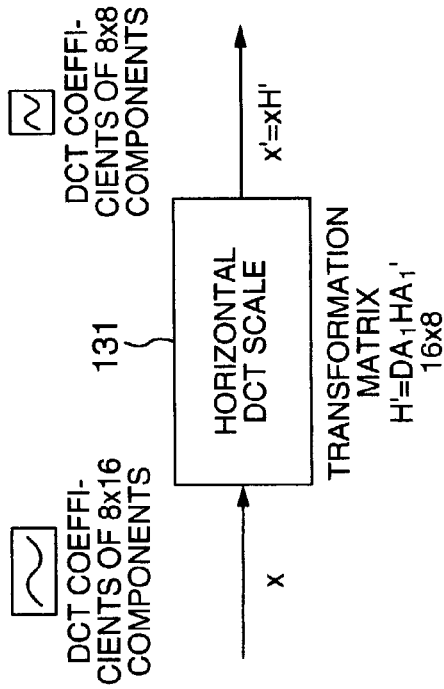

FIG. 4

$$\begin{bmatrix} x_{00} & x_{01} & x_{02} & x_{03} & x_{04} & x_{05} & x_{06} & x_{07} \\ x_{10} & x_{11} & x_{12} & x_{13} & x_{14} & x_{15} & x_{16} & x_{17} \\ x_{20} & x_{21} & x_{22} & x_{23} & x_{24} & x_{25} & x_{26} & x_{27} \\ x_{30} & x_{31} & x_{32} & x_{33} & x_{34} & x_{35} & x_{36} & x_{37} \\ x_{40} & x_{41} & x_{42} & x_{43} & x_{44} & x_{45} & x_{46} & x_{47} \\ x_{50} & x_{51} & x_{52} & x_{53} & x_{54} & x_{55} & x_{56} & x_{57} \\ x_{60} & x_{61} & x_{62} & x_{63} & x_{64} & x_{65} & x_{66} & x_{67} \\ x_{70} & x_{71} & x_{72} & x_{73} & x_{74} & x_{75} & x_{76} & x_{77} \end{bmatrix}$$

$$\begin{bmatrix} 0.5000 & 0.4531 & 0.0000 & -0.1591 & 0.0000 & 0.1063 & 0.0000 & -0.0901 \\ 0.0000 & 0.2039 & 0.4904 & 0.3879 & 0.0000 & -0.1728 & 0.0000 & 0.1362 \\ 0.0000 & -0.0345 & 0.0000 & 0.2371 & 0.4619 & 0.3549 & 0.0000 & -0.1734 \\ 0.0000 & 0.0095 & 0.0000 & -0.0406 & 0.0000 & 0.2039 & 0.4157 & 0.3599 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.5000 & -0.4531 & 0.0000 & 0.1591 & 0.0000 & -0.1063 & 0.0000 & 0.0901 \\ 0.0000 & 0.2039 & -0.4904 & 0.3879 & 0.0000 & -0.1728 & 0.0000 & 0.1362 \\ 0.0000 & 0.0345 & 0.0000 & -0.2371 & 0.4619 & -0.3549 & 0.0000 & 0.1734 \\ 0.0000 & 0.0095 & 0.0000 & -0.0406 & 0.0000 & 0.2039 & -0.4157 & 0.3599 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \\ 0.0000 & 0.0000 & 0.0000 & 0.0000 & 0.0000 & 0.0000 & 0.0000 & 0.0000 \end{bmatrix}$$

BITSTREAM TRANSCODER

BACKGROUND OF THE INVENTION

The present invention relates to an image information transcoding apparatus, a bitstream transcoder and a method for transcoding and transmitting image information, in which processing such as change of resolution is carried out upon a compressed video signal so as to compress the video signal again, and the compressed video signal is output.

For example, the background art related to the present invention includes a technique disclosed in JP-A-2001-285875. The technique disclosed in this official gazette has an object that is "to reduce computational cost and video memory capacity required for transcoding MPEG (Moving Pictures Expert Group)-2 (ISO/IEC 13818) image compressed information to MPEG-4 (ISO/IEC 14496) image compressed information". An image information transcoding apparatus according to the invention disclosed in this official gazette "includes an MPEG-2 image information decoding portion 18 which uses only 4×8 components out of 8×8 components of DCT coefficients of a macroblock to decode an interlaced image; a scanning conversion portion 19 which selects one of first and second fields of the interlaced image decoded by the MPEG-2 image information decoding portion 18, and generates an image by sequential scanning; a down sampler 20 which performs horizontal sampling on the image generated by the scanning conversion portion 19; a down sampler 21 which performs vertical down sampling on the image down-sampled by the down-sampler 20; and encoding means 22 which encodes the image down-sampled by the down sampler 21 so as to obtain MPEG-4 image compressed information".

SUMMARY OF THE INVENTION

As described above, when an MPEG-2 stream is transcoded to an MPEG-4 stream, a video signal is transformed into pixel values in a spatial area in order to perform down sampling though each of the bitstreams has an image encoded with DCT (Discrete Cosine Transform) coefficients in a frequency area by use of DCT. In addition, motion search is carried out in both the bitstreams and the residual is recalculated. Generally, decoding requires computational cost for IDCT (Inverse DCT), and encoding requires computational cost for motion search, DCT and recalculation of the residual. Further, MC (Motion Compensation) in decoding and ME (Motion Estimation) and MC in encoding require a memory area for storing a reference frame.

It is an object of the present invention to provide a method of stream transcoding in which the computational cost and the memory area required for the stream transcoding are suppressed so that the stream transcoding is performed with a reduced number of times of computing and a reduced memory area.

In order to attain the foregoing object, according to the present invention, motion vectors output from a Valiable Length Decoding VLD portion in a decoder and DCT coefficients output from an Inverse quantizing IQ portion are down-sampled to transcode an image. Specifically, down-sampling of DCT coefficients designates an operation for executing band-limiting filtering, one-dimensional IDCT, down-sampling and one-dimensional DCT simultaneously in each of the vertical direction and the horizontal direction. Down-sampling of motion vectors designates an operation for scaling down the horizontal and vertical components of the motion vectors respectively.

BRIEF DESCRIPTION OF THE DRAWINGS

These and other features, objects, and advantages of the present invention will become more apparent from the following description when taken in conjunction with the accompanying drawings wherein:

FIG. 2 is a block diagram showing input/output of a horizontal DCT scaling portion in the first embodiment of the present invention;

FIG. 3 is a block diagram showing input/output and arithmetic processing in one horizontal down-sampling;

FIG. 4 is a diagram showing a band-limited range in the first embodiment of the present invention;

FIG. 5 is a diagram showing an example of a down-sampling transformation matrix H' under band-limitation to 8×4 in the first embodiment of the present invention;

DETAILED DESCRIPTION OF EMBODIMENTS

Figure 1:
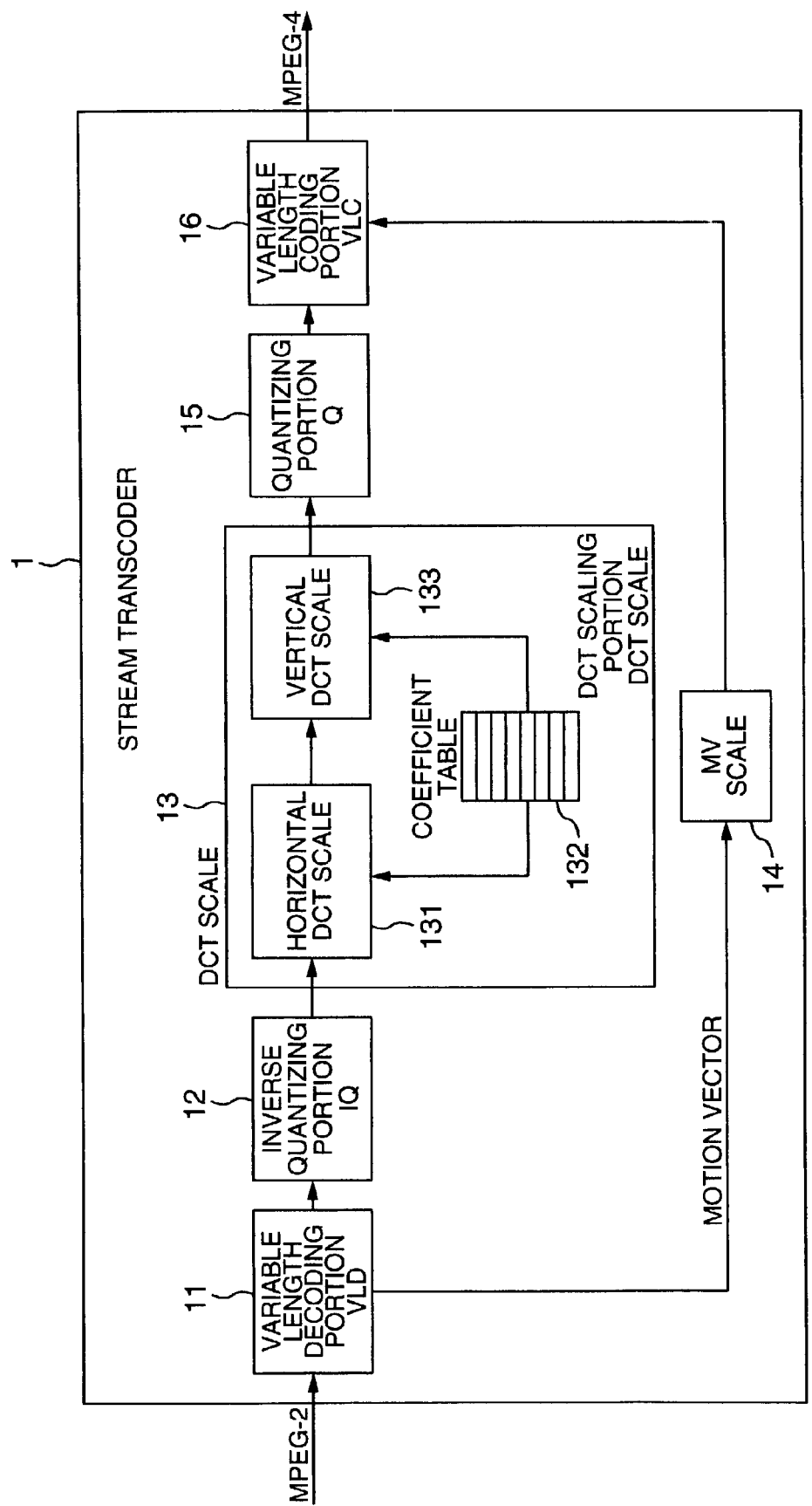
FIG. 1 is a block diagram showing a first embodiment of the present invention.

Description will be made below on the details of an embodiment of the present invention with reference to FIG. 1 showing the embodiment. As shown in FIG. 1, this stream transcoder 1 is constituted by a VLD portion 11, an IQ portion 12, a DCT scaling (hereinafter referred to as "DCT SCALE") portion 13, a motion vector scaling (hereinafter referred to as "MV SCALE") portion 14, a quantizing (hereinafter referred to as "Q") portion 15 and a variable length coding (hereinafter referred to as "VLC") portion 16.

The VLD portion 11 reads an MPEG-2 stream, carries out variable length decoding (VLD) thereon, and outputs quantized DCT coefficients and motion vectors.

The IQ portion 12 receives the quantized DCT coefficients from the VLD portion 11, carries out inverse quantization thereon, and outputs the DCT coefficients.

The MV SCALE portion 14 receives the motion vectors from the VLD portion 11, and scales down the horizontal and vertical components thereof.

The DCT SCALE portion 13 is constituted by a horizontal DCT SCALE portion 131, a coefficient table 132 and a vertical DCT SCALE portion 133. The horizontal DCT SCALE portion 131 extracts a matrix H' from the coefficient table 132. The matrix H' is used to perform horizontal band-limiting filtering, horizontal one-dimensional IDCT, horizontal down-sampling and horizontal one-dimensional DCT simultaneously. The horizontal DCT SCALE portion 131 multiplies the DCT coefficients supplied from the IQ portion 12 by the matrix H' so as to perform horizontal down-sampling thereon. The coefficient table 132 stores transformation matrices meeting a down-sampling method set in advance.

Similarly, the vertical DCT SCALE portion 133 extracts a matrix V' from the coefficient table 132. The matrix V' is used to perform vertical band-limiting filtering, vertical one-dimensional IDCT, vertical down-sampling and vertical one-dimensional DCT simultaneously. The vertical DCT SCALE portion 133 multiplies the horizontally down-sampled DCT coefficients supplied from the horizontal DCT SCALE portion 131 by the matrix V' so as to perform vertical down-sampling thereon. The vertical DCT SCALE portion 133 judges whether the input DCT coefficients are of a frame DCT composed by frame unit or a field DCT composed by field unit. Then, the vertical DCT SCALE portion 133 extracts a transformation matrix V' corresponding to the method of the judged DCT, and performs an arithmetic operation with the transformation matrix V'.

The Q portion 15 performs quantization and outputs quantized DCT coefficients.

The VLC portion 16 carries out variable length coding (VLC) upon the quantized DCT coefficients and the motion vectors, and outputs an MPEG-4 stream.

When the motion vectors which have not been transformed are used also in the MV SCALE portion 14, the portions corresponding to MC, DCT, ME, IDCT and MC in the background art can be omitted. Thus, the computational cost and the use of memory capacity can be reduced.

In addition, when the band-limiting filtering, the one-dimensional IDCT, the down-sampling and the one-dimensional DCT are performed all together by a matrix operation in the DCT SCALE portion 13, the computational cost can be reduced in comparison with that in the case of sequential multiplying operations by transformation matrices.

Description will be made below on the reduction of computational cost by the DCT SCALE portion 13 and the method for calculating the transformation matrices H' and V'. Description will be made on the processing of the horizontal DCT SCALE portion 131 by way of example while comparing FIG. 2 showing a method of implementation in the present invention with FIG. 3 showing a method of implementation in one embodiment. For the sake of convenience of description, assume that only 8×4 components are valid in the band-limiting filter as shown in a range 50 in FIG. 4, and the processing of down-sampling is set at ½ in the horizontal direction.

As shown in FIG. 2, the horizontal DCT SCALE portion 131 receives DCT coefficients x of 8×16 components as its input, and outputs DCT coefficients x' of 8×8 components after down-sampling. The down-sampling of the DCT coefficients can be carried out by multiplying the DCT coefficients x of 8×16 components by the down-sampling transformation matrix H' from the right. Thus, the output DCT coefficients x' can be expressed by the following expression (1).

$$x' = xH' \quad (1)$$

On the other hand, one embodiment shown in FIG. 3 is constituted by four processings, that is, a horizontal band-limiting filter 40, a horizontal one-dimensional IDCT 41, a horizontal scaler 42 and a horizontal one-dimensional DCT 43, and carried out in the following procedure. The horizontal band-limiting filter 40 multiplies the DCT coefficients x of 8×16 components by a transformation matrix D from the right. The transformation matrix D performs band-limiting on the DCT coefficients x so as to pass only the range 50 in FIG. 4 while setting 0 in the other components out of the range 50. The horizontal one-dimensional IDCT 41 multiplies the band-limited DCT coefficients x of 8×16 components by an IDCT transformation matrix $A_1$ of 16×16 components from the right so as to transform the DCT coefficients x into pixel values of 8×16 components. Here, in the transformation matrix $A_1$, transformation matrices $a_1$ for use in multiplication in the horizontal one-dimensional IDCT 41 in the background-art implementation method have been arranged as follows.

$$\begin{bmatrix} a_1 & 0 \\ 0 & a_1 \end{bmatrix}$$

Here, O designates a zero matrix whose 8×8 components are all zero.

The horizontal scaler 42 multiplies the pixel values of 8×16 components by a transformation matrix H of 16×8 components from the right, so as to transform the 8×16 pixels into pixel values of 8×8 components. The horizontal one-dimensional DCT 43 multiplies the pixel values of 8×8 components by a DCT transformation matrix $A_1'$ of 8×8 components so as to obtain DCT coefficients of 8×8 components. Thus, the output x' can be expressed by the following expression (2).

$$x' = xDA_1HA_1' \quad (2)$$

Since the transformation carried out in FIG. 2 is the same as that in FIG. 3, the transformation matrix H' is expressed by the following expression (3) from the expressions (1) and (2).

$$H' = DA_1HA_1' \quad (3)$$

As compared in the computational cost required for transformation, down-sampling can be performed by a matrix operation at one time in FIG. 2 while it is necessary to make matrix operations four times in one embodiment system in FIG. 3. Thus, it is clearly proved that the computational cost is reduced in FIG. 2. In addition, as compared with the case where a high-speed arithmetic algorithm of 8×8 DCT is adopted, down-sampling can be performed with reduced computational cost in the system according to the present invention.

The computational cost in the down-sampling method according to the present invention will be compared below with that in a down-sampling method using Chen's algorithm (reference: W. H. Chen et al.; A fast computational algorithm for the discrete cosine transform; IEEE Trans. Commun., vol. 25, No. 9, pp.1004–1009, 1977) known as a high-speed arithmetic algorithm of 8×8 DCT. In the same manner as described above, assume that only 8×4 components are valid in the band-limiting filter as shown in the range 50 in FIG. 4, and down-sampling is set at ½ in the horizontal direction.

When the computational cost in the Chen's algorithm is calculated on the assumption that the components out of the range 50 in FIG. 4 are zero, 128 times of multiplication and 176 times of addition are required for 8×8 horizontal one-dimensional DCT. The same computation cost also applies to the case for IDCT. In addition, 32 times of addition are required for horizontal down-sampling in a spatial area. Thus, the following number of times of computing is required for IDCT of 2 DCT coefficient blocks each having 8×8 components, down-sampling, and then DCT of one pixel block of 8×8 components.

| multiplication: | 128 × 2 + 128 = | 384 times |
|---|---|---|
| addition: | 176 × 2 + 32 + 176 = | 560 times |
| total: | | 944 times |

On the other hand, FIG. 5 shows the transformation matrix H' for performing the same operation according to the present invention. The following number of times of computing is required for multiplying DCT coefficients of 8×16 components by this matrix. It is proved that down-sampling can be performed with a reduced number of times of computing in comparison with that by use of the Chen's algorithm.

| multiplication: | 320 times |
|---|---|
| addition: | 256 times |
| total: | 576 times |

Further, the band-limited range may be changed in accordance with the distribution of input DCT coefficient values obtained from the VLD portion 11. That is, in the case of a simple block having a small number of large coefficient values in a high frequency portion, only a narrower range than the range 50 in FIG. 4 may be passed to further reduce the computational cost. On the contrary, in the case of a complicated image in which DCT coefficients are distributed up to a high frequency portion, a wider range than the range 50 in FIG. 4 may be passed to perform detailed down-sampling. When the band-limited range is changed in accordance with the distribution of DCT coefficients, high-quality down-sampling can be performed in comparison with that with a fixed band-limited range. Transformation matrices H' corresponding to such band-limited ranges are stored in the coefficient table 132, and one matrix H' suitable to DCT coefficient values is read therefrom.

The band-limited range may be not only controlled thus but also controlled in accordance with a frame rate of frames to be output. That is, when the band-limited range is extended to enhance the image quality, the computational cost may increases not to fulfill a predetermined frame rate. In such a case, the band-limited range can be controlled to be made narrow enough to secure a processing speed for image transformation.

Figure 6:
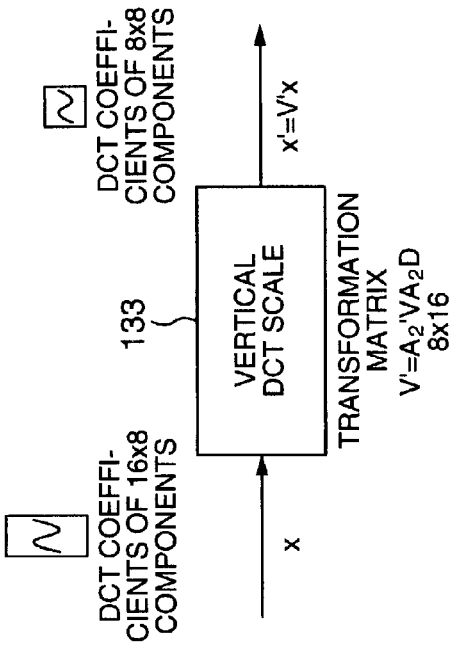
FIG. 6 is a block diagram showing input/output of a vertical DCT scaling portion in the first embodiment of the present invention.
Figure 7:
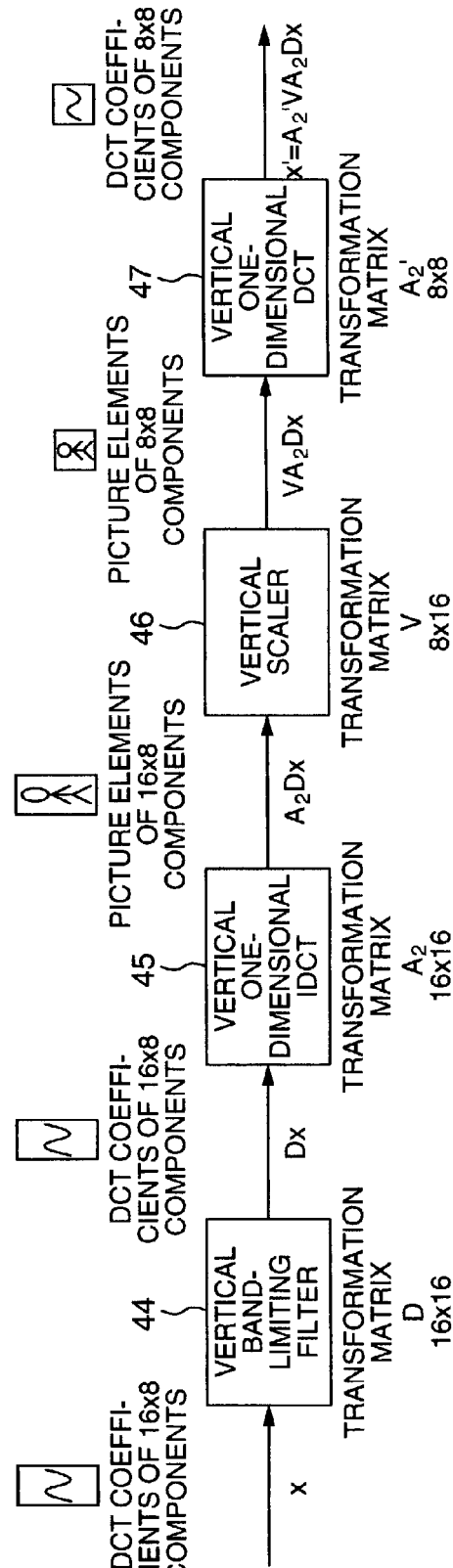
FIG. 7 is a block diagram showing input/output and arithmetic processing in one vertical down-sampling.

Next, description will be made on vertical down-sampling. FIG. 6 is a diagram showing an implementation method according to the present invention. FIG. 7 is a diagram showing an implementation method in one embodiment. The methods perform processings similar to those in FIGS. 2 and 3 respectively. Therefore, detailed description will be omitted. However, in the vertical down-sampling processing, input DCT coefficients of 16×8 components are multiplied by a transformation matrix V' from the left. The effect of reduction in computational cost, the method for controlling the band-limited range and the effect of the method follow those in the horizontal down-sampling processing.

In vertical down-sampling, in addition to the aforementioned effect, there can be obtained an effect that a macroblock encoded by field DCT is transformed into a frame DCT macroblock efficiently. For example, a transformation matrix V' may perform down-sampling on DCT coefficients transformed based on field DCT so as to output DCT coefficients based on frame DCT. That is, of pixels of 16×8 components obtained after vertical one-dimensional IDCT, a top field of upper 8 lines and a bottom field of lower 8 lines are exchanged with each other, multiplied by a transformation matrix S to form a frame structure, and then multiplied by a down-sampling transformation matrix V. Thus, output DCT coefficients have a frame structure. The transformation matrix V' at this time is expressed by the following expression (4).

$$V' = A_2'VSA_2 \qquad (4)$$

In low profile of MPEG-4, field DCT is not adopted. On the other hand, field DCT is frequently used in MPEG-2. Therefore, this processing which can perform transformation from field DCT to frame DCT together with down-sampling is effective.

Figure 8:
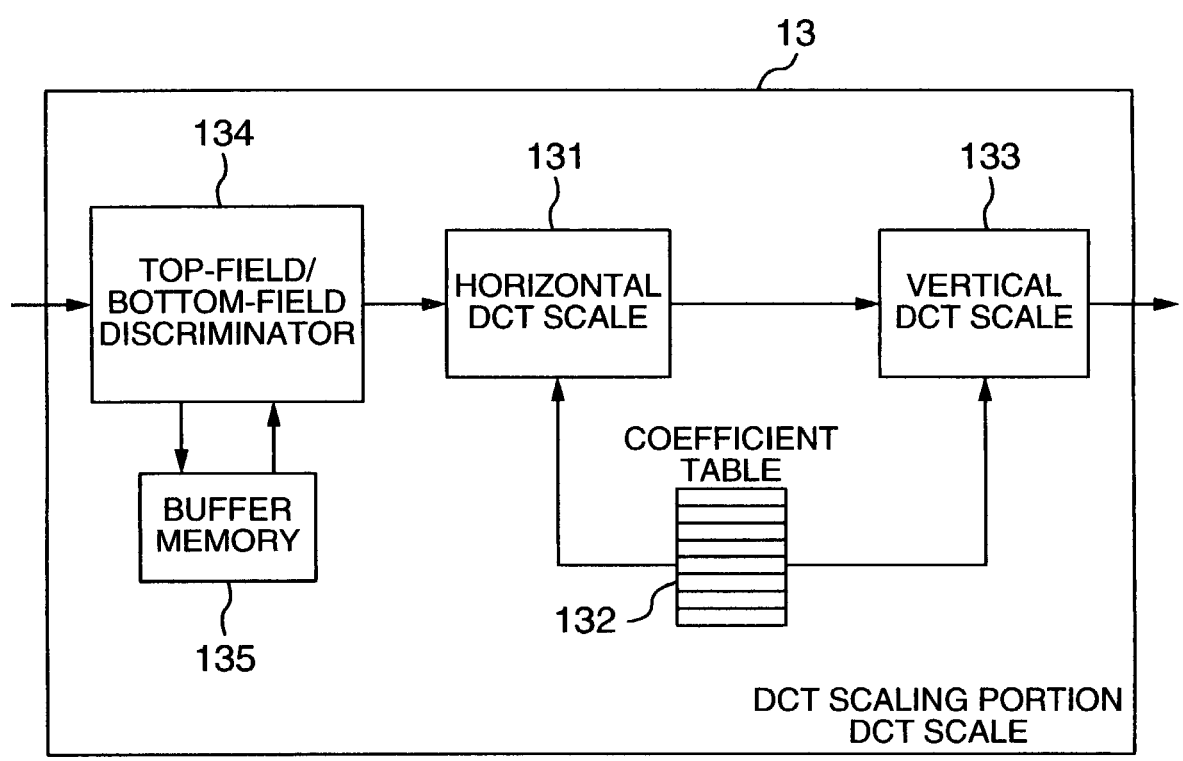
FIG. 8 is a block diagram showing a second embodiment of the present invention.

Next, description will be made on a second embodiment shown in FIG. 8. FIG. 8 is a diagram showing the internal structure of the DCT SCALE portion 13 in FIG. 1. In FIG. 8, a horizontal DCT SCALE portion 131, a coefficient table 132 and a vertical DCT SCALE portion 133 are the same as those in FIG. 1, and their description will be omitted. Supplied with a bitstream having a field structure encoded by field, a top-field/bottom-field discriminator 134 stores DCT coefficients belonging to a top field into a buffer memory 135.

When DCT coefficients made of 8×8 components belonging to a bottom field are supplied, DCT coefficients made of 8×8 components in its corresponding top field are read from the buffer memory 135, and supplied to the vertical DCT SCALE portion 133 as DCT coefficients of 16×8 components using field DCT. The vertical DCT SCALE portion 133 multiplies the DCT coefficients by the transformation matrix V' shown in the expression (4) in the first embodiment, so as to obtain DCT coefficients using frame DCT.

Thus, in the second embodiment according to the present invention, transformation from a field structure to a frame structure can be attained together with vertical down-sampling. In addition, processing of a frame to be transformed can be started as soon as DCT coefficients belonging to a bottom field are supplied, so that the processing delay between input and output can be reduced. In addition, since low profile of MPEG-4 does not support any field structure, this system which can perform transformation from field DCT to frame DCT together with down-sampling is effective.

Figure 9:
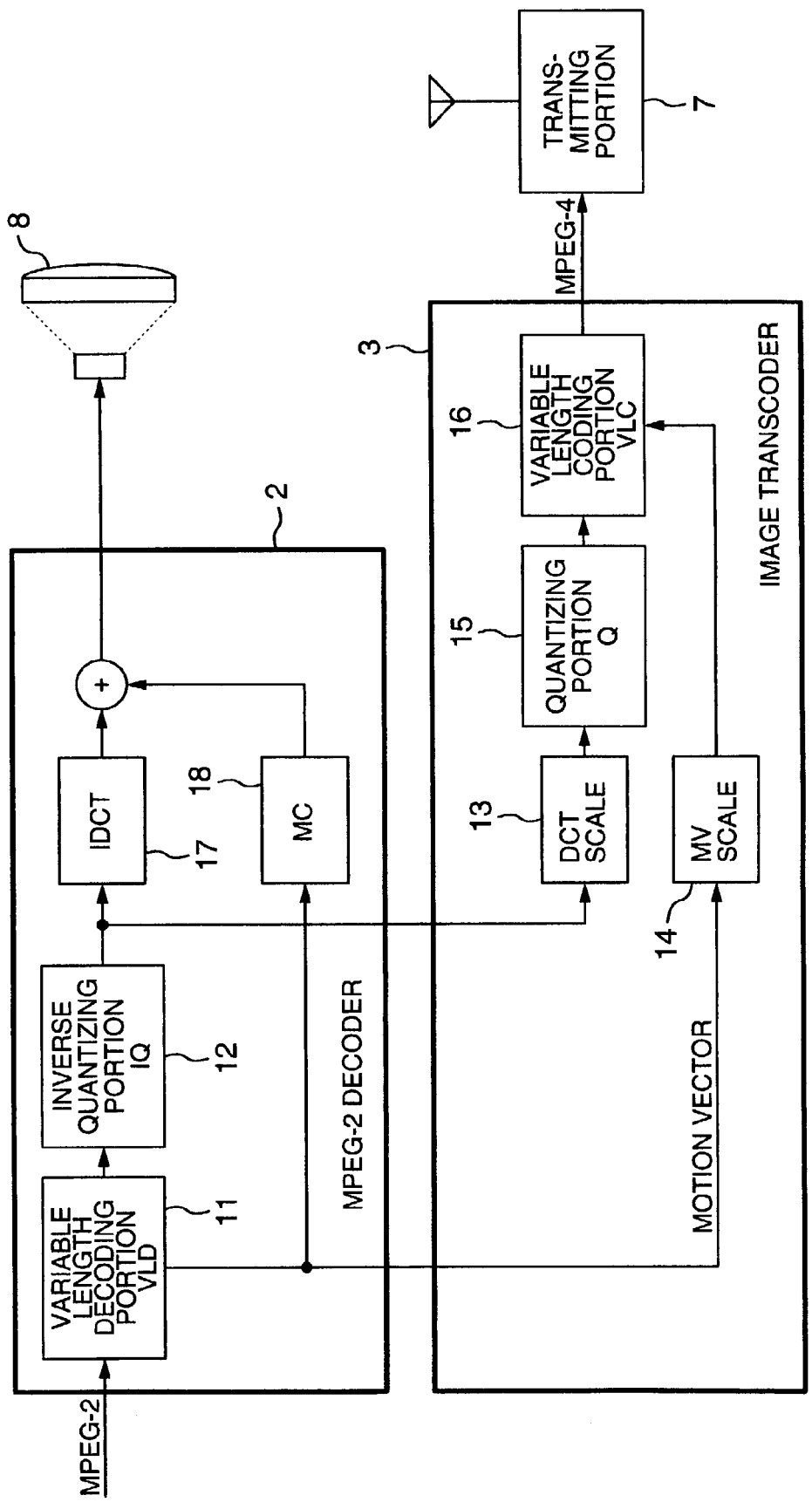
FIG. 9 is a block diagram showing a third embodiment of the present invention.

Next, description will be made on a third embodiment shown in FIG. 9. A display unit with a stream transcoder in FIG. 9, such as an imaging/recording/reproducing apparatus, is constituted by an image transcoder 3, an MPEG-2 decoder 2, a display 6 and a transmitting portion 7. In FIG. 9, parts the same as those in FIG. 1 are referred to by the same numerals as those in FIG. 1, and their description will be omitted.

The MPEG-2 decoder 2 is constituted by a VLD portion 11, an IQ portion 12, an IDCT portion 17 and an MC portion 18. For example, the MPEG-2 decoder 2 supplies the image transcoder 3 with motion vectors and inverse quantized DCT coefficients generated from an MPEG-2 stream from a DVD drive. Further, the MPEG-2 decoder 2 decodes the DCT coefficients and supplies the decoded DCT coefficients to the display 6.

The image transcoder 3 has a DCT SCALE portion 13, an MV SCALE portion 14, a Q portion 15 and a VLC portion 16. The image transcoder 3 generates an MPEG-4 stream by use of the motion vectors and the inverse quantized DCT coefficients from the VLD portion 11 of the MPEG-2 decoder 2.

The display 6 displays a video signal supplied by the MPEG-2 decoder 2. The transmitting portion 7 distributes the MPEG-4 stream supplied by the image transcoder 3, via a wireless path.

According to the third embodiment of the present invention, as soon as the MPEG-2 decoder 2 decodes a video image, the video image can be encoded in MPEG-4 and distributed. The image transcoder 3 can perform encoding by use of processing with lower computational cost than that of an ordinary MPEG-4 encoder. Thus, the load of processing can be lightened or the arithmetic circuit scale can be reduced.

Although an imaging/recording/reproducing apparatus is constituted by the MPEG-2 decoder 2 and the image transcoder 3 in the third embodiment, the imaging/recording/reproducing apparatus may include the display 6, the transmitting portion 7, not-shown imaging means, not-shown recording means and not-shown reproducing means. In addition, a video image merely transcoded from MPEG-2 to MPEG-4 may be transmitted without decoding. Further, in addition to the wireless transmission, wire transmission may be adopted as transmitting means.

In the third embodiment, means for reproducing recording media may be connected to a stage followed by the MPEG-2 decoder 2, as input thereto. In addition, DVD, hard disk, etc. may be adopted as the recording media.

Figure 10:
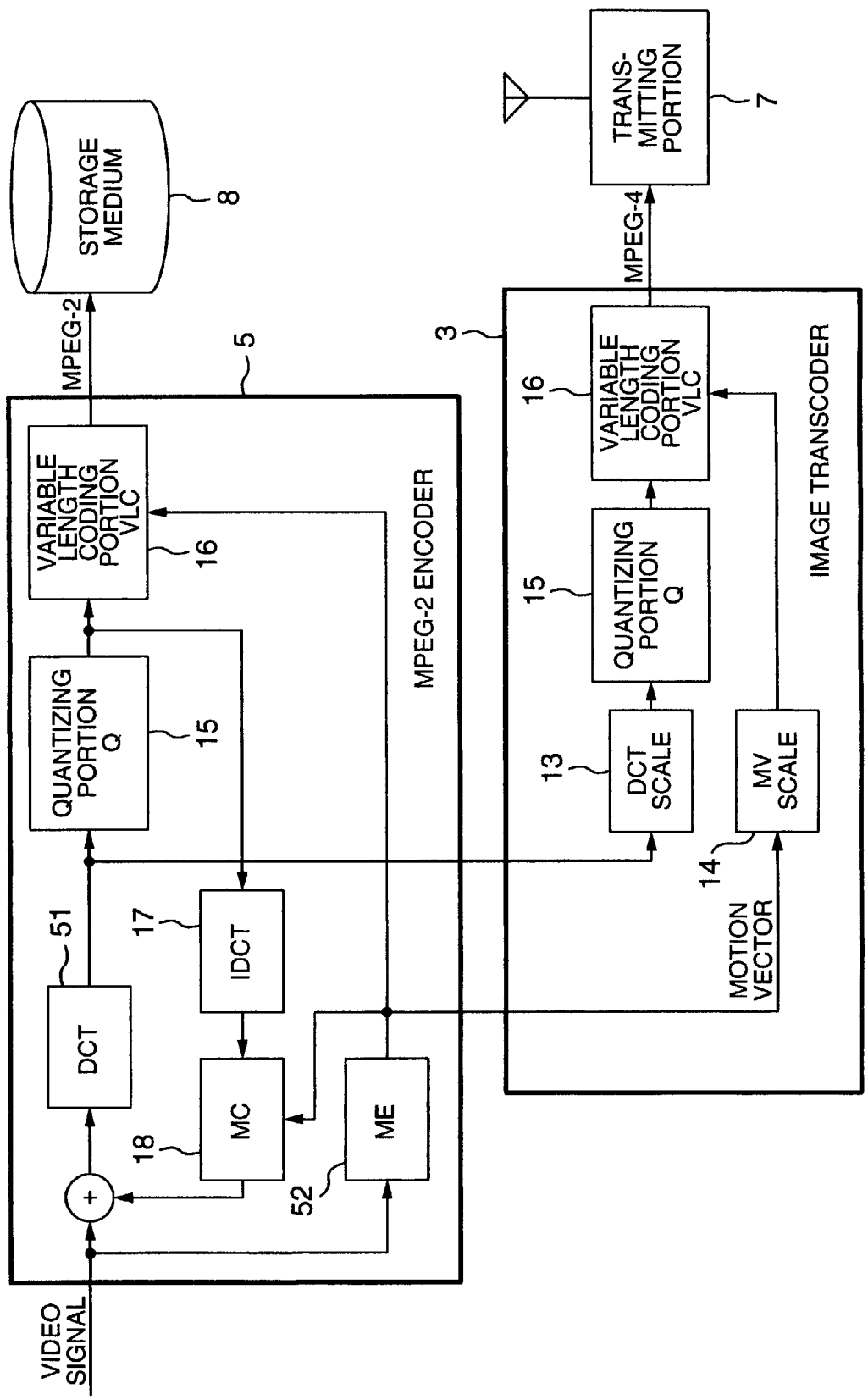
FIG. 10 is a block diagram showing a fourth embodiment of the present invention.

Next, description will be made on a fourth embodiment shown in FIG. 10. A recording unit with a stream transcoder in FIG. 10 is constituted by an MPEG-2 encoder 5, an image transcoder 3, a recording medium 8 and a transmitting portion 7. In FIG. 10, parts the same as those in FIG. 1 are referred to by the same numerals as those in FIG. 1, and their description will be omitted.

The MPEG-2 encoder 5 has a DCT portion 51, an ME portion 52, a Q portion 15, a VLC portion 16, an IDCT portion 17, an MC portion 18, and an adder.

The image transcoder 3 has the same configuration as that of the image transcoder 3 shown in FIG. 9.

The recording medium 8 records a video signal supplied by the MPEG-2 encoder 5. The transmitting portion 7 distributes the MPEG-4 stream supplied by the image transcoder 3, via a wireless path.

The DCT SCALE portion 13 receives DCT coefficients supplied by the DCT portion 51, and performs horizontal and vertical down-sampling thereon. The MV SCALE portion 14 performs horizontal and vertical down-sampling on motion vectors supplied by the ME portion 52.

Although an imaging/recording apparatus is constituted by the MPEG-2 encoder 5 and the image transcoder 3 in the fourth embodiment, the imaging/recording apparatus may include the transmitting portion 7, the recording means 8, not-shown imaging means and not-shown reproducing means. In addition, a video image merely transcoded from MPEG-2 to MPEG-4 may be transmitted without decoding. Further, in addition to the wireless transmission, wire transmission may be adopted as transmitting means.

In the fourth embodiment, means for imaging on recording media may be connected to a stage followed by the MPEG-2 encoder 5, as input thereto. In addition, DVD, hard disk, etc. may be adopted as the recording media.

According to the fourth embodiment of the present invention, as soon as the MPEG-2 encoder 5 encodes a video image into an MPEG-2 stream, the video image can be encoded into an MPEG-4 stream by the image transcoder 3 and distributed. The image transcoder 3 can perform encoding by use of processing with lower computational cost than that of an ordinary MPEG-4 encoder. Thus, the load of processing can be lightened or the arithmetic circuit scale can be reduced. Particularly, a motion search portion shares the MPEG-2 function so that the memory area required for computing can be reduced.

According to the present invention, the computational cost and the memory area required for stream transcoding are suppressed so that stream transcoding can be performed with a reduced number of times of computing and a reduced memory area.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

What is claimed is:

1. A bitstream transcoder comprising:

a variable length decoder (VLD) which performs variable length decoding on a bitstream encoded in a first compression method, and outputs quantized DCT coefficients;

an inverse quantizer (IQ) which receives said quantized DCT coefficients from said VLD portion, performs inverse quantizing thereon, and outputs DCT coefficients;

a coefficient table which stores a transformation matrix obtained by multiplying transformation matrices for operating band-limiting filter, inverse DCT (IDCT), down-sampling and DCT, respectively, together in advance;

a DCT scaler (DCT SCALE) which receives said DCT coefficients from said IQ portion and performs down-sampling thereon by use of said transformation matrix read from said coefficient table;

a quantizer (Q) which receives said DCT coefficients, down-sampled horizontally and vertically, from said DCT SCALE portion, quantizes said DCT coefficients, and outputs quantized DCT coefficients; and a variable length coder (VLC) which encodes said quantized DCT coefficients from said Q portion in a second compression method, to output a bitstream, wherein a transformation matrix obtained by multiplying matrices for operating band-limiting filter, IDCT, converting from field DCT to frame DCT, down-sampling and DCT, respectively, together, is stored in said coefficient table in advance, and said transformation matrix is used for down-sampling when said DCT coefficients supplied are based on field DCT in which DCT is performed by field, so that DCT coefficients outputted are based on frame DCT in which DCT is performed by frame.

2. A bitstream transcoder comprising:

a variable length decoder (VLD) which performs variable length decoding on a bitstream encoded in a first compression method, and outputs quantized DCT coefficients;

an inverse quantizer (IQ) which receives said quantized DCT coefficients from said VLD portion, performs inverse quantizing thereon, and outputs DCT coefficients;

a coefficient table which stores a transformation matrix obtained by multiplying transformation matrices for operating band-limiting filter, inverse DCT (IDCT), down-sampling and DCT, respectively, together in advance;

a DCT scaler (DCT SCALE) which receives said DCT coefficients from said IQ portion and performs down-sampling thereon by use of said transformation matrix read from said coefficient table;

a quantizer (Q) which receives said DCT coefficients, down-sampled horizontally and vertically, from said DCT SCALE portion, quantizes said DCT coefficients, and outputs quantized DCT coefficients; and a variable length coder (VLC) which encodes said quantized DCT coefficients from said Q portion in a second compression method, to output a bitstream, wherein a transformation matrix obtained by multiplying matrices for operating band-limiting filter, IDCT, converting from field DCT to frame DCT, down-sampling and DCT, respectively, together, is stored in said coefficient table in advance, and said transformation matrix is used for down-sampling when said DCT coefficients supplied are based on field DCT in which DCT is performed by field, so that DCT coefficients outputted are based on frame DCT in which DCT is performed by frame, wherein said DCT SCALE portion includes a top-field/bottom-field discriminator which judges which field said DCT coefficients supplied belong to, a top field or a bottom field, and a buffer memory for storing DCT coefficients of said top field; and said top-field/bottom-field discriminator stores said DCT coefficients belonging to said top field into said buffer memory when a bitstream having a field structure encoded by field is supplied, while said top-field/bottom-field discriminator supplies DCT coefficients belonging to said bottom field and corresponding DCT coefficients belonging to said top field, to said horizontal DCT scaling portion when said DCT coefficients belonging to said bottom field is supplied.

3. A bitstream transcoder comprising:

a variable length decoder (VLD) which performs variable length decoding on a bitstream encoded in a first compression method, and outputs quantized DCT coefficients;

an inverse quantizer (IQ) which receives said quantized DCT coefficients from said VLD portion, performs inverse quantizing thereon, and outputs DCT coefficients;

a coefficient table which stores a transformation matrix obtained by multiplying transformation matrices for operating band-limiting filter, inverse DCT (IDCT), down-sampling and DCT, respectively, together in advance;

a DCT scaler (DCT SCALE) which receives said DCT coefficients from said IQ portion and performs down-sampling thereon by use of said transformation matrix read from said coefficient table;

a quantizer (Q) which receives said DCT coefficients, down-sampled horizontally and vertically, from said DCT SCALE portion, quantizes said DCT coefficients, and outputs quantized DCT coefficients; and a variable length coder (VLC) which encodes said quantized DCT coefficients from said Q portion in a second compression method, to output a bitstream;

an inverse discrete cosine transformer (IDCT) which receives said DCT coefficients from said inverse quantizing portion, performing IDCT thereon, and outputs pixel values; and an MC portion which receives motion vectors from said VLD portion, extracts a reference image designated by said motion vectors, adds said reference image to said pixel values supplied by said IDCT portion, and outputs said pixel values added with said reference image;

wherein said bitstream encoded in said first compression method is decoded while a bitstream encoded in said second compression method is obtained.

* * * * *